United States Patent [19]
Jeng et al.

[11] Patent Number: 6,158,898
[45] Date of Patent: Dec. 12, 2000

[54] PRELOADING REGULATING MECHANISM FOR ROLLING BEARINGS

[75] Inventors: Yeau-Ren Jeng, Tainan; Cheng-Chang Ling; De-Shin Liu, both of Chia-Yi, all of Taiwan

[73] Assignee: National Science Council, Taipei, Taiwan

[21] Appl. No.: 09/291,534

[22] Filed: Apr. 14, 1999

[51] Int. Cl.[7] .................................................. F16C 23/06
[52] U.S. Cl. ........................................ 384/518; 384/519
[58] Field of Search ................................ 384/517, 518, 384/519, 563, 583

[56] References Cited

U.S. PATENT DOCUMENTS

| | | | |
|---|---|---|---|
| 2,953,417 | 9/1960 | Horberg | 384/517 |
| 3,804,562 | 4/1974 | Hansson | 384/517 X |
| 3,948,577 | 4/1976 | Gamet | 384/583 X |
| 4,000,559 | 1/1977 | Korrenn et al. | 384/101 |
| 4,476,614 | 10/1984 | Pittroff | 384/570 X |
| 4,551,032 | 11/1985 | Mottershead | 384/517 |
| 4,618,272 | 10/1986 | Lindstrom | 384/517 |
| 4,997,290 | 3/1991 | Aida | 384/99 |
| 5,048,979 | 9/1991 | Coates | 384/519 |
| 5,051,005 | 9/1991 | Duncan | 384/517 |
| 5,094,551 | 3/1992 | Kitamura et al. | 384/518 |
| 5,209,701 | 5/1993 | Ishikawa et al. | 384/544 X |
| 5,658,081 | 8/1997 | Huang et al. | 384/447 |
| 5,899,574 | 5/1999 | Chujo | 384/518 |

*Primary Examiner*—Thomas R. Hannon
*Attorney, Agent, or Firm*—Knobbe, Martens, Olson & Bear, LLP

[57] ABSTRACT

A preloading regulating mechanism for rolling bearings which is adapted to be used to adjust an axial force on the rolling bearings is disclosed. The preloading regulating mechanism includes a first fixing member, a regulator disposed in the first fixing member for allowing a user to apply a torque thereon, an annular plate having a first face connected to the regulator for being moved in response to the torque exerted from the regulator, a resilient member having a first end connected to a second face of the annular plate for urging against the annular plate to form an elastic force, and a movable annular element connected to a second end of the resilient member for transmitting the elastic force to form the axial force on the rolling bearing in response to the motion of the annular plate.

14 Claims, 2 Drawing Sheets

PRELOADING REGULATING MECHANISM FOR ROLLING BEARINGS

FIELD OF THE INVENTION

The present invention is related to a preloading regulating mechanism which is adapted to be used to adjust an axial force exerted on rolling bearings.

BACKGROUND OF THE INVENTION

Rolling bearings have been widely used for many rotating systems including machine tool, turbine, pump, etc. due to their modest cost, low friction, high rigidity and high ability to support combinations of radial and thrust load.

An axial force is required on rolling bearing to reduce clearance between rolling elements and races and to increase stiffness. The axial force is also called preload. However, a large preload may cause a heavy load on the bearing, and adversely affect the fatigue life, temperature rise and power consumption. On the contrary, low preload may lead to larger vibration, excessive sliding between rolling elements and raceways and running error of the spindle. Therefore, a suitable preload is instrumental in reducing friction, heat generation, power consumption and running error of the spindle.

Normally, fixed-displacement method or fixed-load method are used to apply preload to bearings. For fixed-displacement preload, a relative displacement between the outer and the inner races is created in the axial direction. This method is not suitable for high-speed rolling bearings because thermal expansion will induce large load and temperature rise on bearings and result in bearing seizure. A fixed-load preload can be applied by making use of springs to exert an axial force on bearings. Since springs can absorb bearing displacement due to temperature rise, the load exerted on the bearings in the axial direction does not increase with the temperature. Hence, the fixed-load preload is adapted to be used in the high-speed spindle.

Modem high-performance spindles generally operate at wide speed range for higher productivity and quality. Therefore, an adjustable preloading mechanism which enables suitable preload is required in order to satisfy different rotating speeds. Certain preloading regulating structures provided with hydrostatic bearings are disclosed in Taiwanese Patent No. 112785 and U.S. Pat. No. 4,551,032. In this embodiment, the structures are complicated and need many tubes for oil delivery. In addition, certain preloading regulating strictures provided with shape memory alloy are disclosed in Taiwanese Patent No. 173365 and U.S. Pat. No. 5,094,551. In this embodiment, making use of deformation of the shape memory alloy with respect to different temperature, a preload exerted on the rolling bearings can be adjusted. However, the memory alloy is very expensive and still exists many problems in application. It is desirable to develop a preloading regulating mechanism to solve the related problems encountered with the prior arts.

SUMMARY OF THE INVENTION

An object of the present invention is to provide a preloading regulating mechanism for rolling bearings which is adapted to be used to adjust an axial force on the rolling bearings.

Another object of the present invention is to provide a preloading regulating mechanism for rolling bearings to enable the user to adjust an axial force on the rolling bearings according to the rotating speed of the spindle. It can effectively reduce manufacturing cost of a spindle and prolong bearing life.

According to the present invention, the preloading regulating mechanism includes a first fixing member, a regulator disposed in the first fixing member for allowing a user to apply a torque thereon, an annular plate having a first face connected to the regulator for being moved in response to the torque exerted from the regulator, a resilient member having a first end connected to a second face of the annular plate for urging against the annular plate to form an elastic force, and a movable annular element connected to a second end of the resilient member for transmitting the elastic force to form the axial force on the rolling bearing in response to the motion of the annular plate.

In accordance with one aspect of the present invention, the regulator includes a screw bolt having screw threads and mounted in the first fixing member and engaged with corresponding screw threads defined in the first fixing member, and a handle connected to one end of the screw bolt for rotating the screw bolt. Preferably, the handle is integrally formed to one end of the screw bolt. In addition, the other end of the screw bolt is connected to the first face of the annular plate.

In accordance with another aspect of the present invention, the screw bolt is moved toward the annular plate when the handle is rotated in one direction in a first instance and is moved away from the annular plate when the handle is rotated in the other direction in a second instance. Certainly, the force exerted on the annular plate increases in the first instance and decreases in the second instance.

In accordance with another aspect of the presents invention, the first end of the resilient member is bound to the second face of the annular plate and the second end of the resilient member is bound to a wall defined in the moveable annular element for generating the elastic force to form the axial force on the rolling bearing. Preferably, the resilient member is a spring.

In accordance with another aspect of the present invention, the annular plate compresses the spring to form the elastic force when the regulator exerts the force on the annular plate.

In accordance with another aspect of the present invention, the preloading regulating mechanism further includes an outer fixing member and an inner fixing member for securing the annular plate and the moveable annular element.

In accordance with another aspect of the present invention, the moveable annular element is disposed between the outer fixing member and the rolling bearing.

In accordance with another aspect of the present invention, the annular plate is disposed between the outer fixing member and the inner fixing member. There is a groove formed on an inner edge of the outer fixing member for restricting the annular plate to move in straight.

In accordance with another aspect of the present invention, the preloading regulating mechanism further includes a plurality of regulators and a plurality of corresponding springs.

The present invention may best be understood through the following description with reference to the accompanying drawings, in which:

DETAILED DESCRIPTION OF THE PREFERRED EMBODIMENTS

Figure 1:
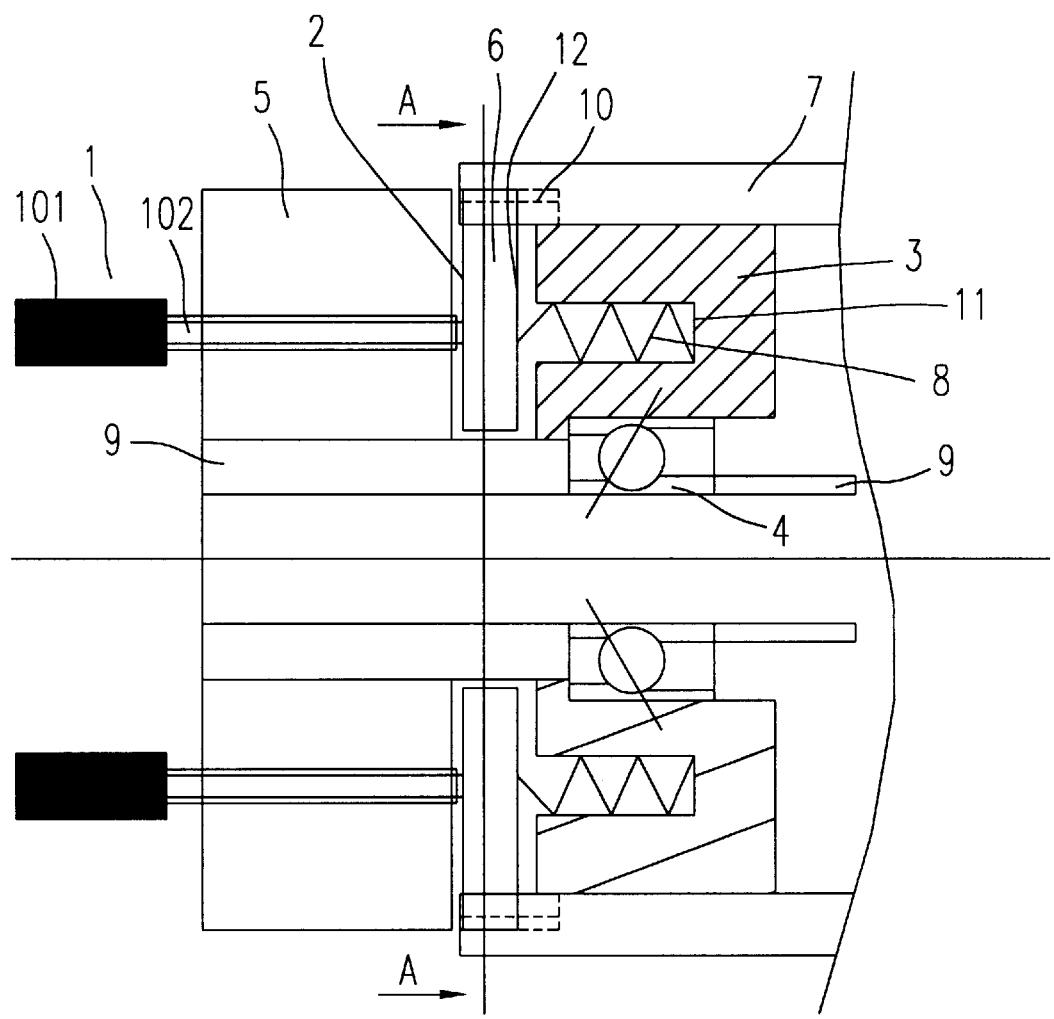
FIG. 1 is a schematic diagram showing a preferred embodiment of the preloading regulating mechanism for rolling bearings according to the present invention.

Please refer to FIG. 1 showing a preferred embodiment of the preloading regulating mechanism for rolling bearings according to the present invention. The preloading regulating mechanism for rolling bearings is adapted to be used to adjust an axial force on the rolling bearings. As shown in FIG. 1, the preloading regulating mechanism for rolling bearings includes a regulator 1 disposed in a first fixing member 5 for allowing a user to apply a torque thereon. The regulator 1 includes a handle 101 and a screw bolt 102. The screw bolt 102 has screw threads (not shown) mounted in the first fixing member 5 and engaged with corresponding screw threads (not shown) defined in the first fixing member 5. The handle 101 is connected to one end of the screw bolt 102 for rotating the screw bolt 102. Preferably, the handle 101 is integrally formed to the end of the screw bolt 102. In addition, the other end of the screw bolt 102 is connected to the first face 2 of the annular plate 6.

The annular plate 6 is connected to the regulator 1 for being moved in response to the torque exerted from the regulator 1. The screw bolt 102 is moved toward the annular plate 6 when the handle 101 is rotated in one direction in a first instance and is moved away from the annular plate 6 when the handle 101 is rotated in the other direction in a second instance. Certainly, the force exerted on the annular plate 6 increases in the first instance and decreases in the second instance.

In addition, the first end of the spring 8 is bound to the second face 12 of the annular plate 6 and the second end of the spring 8 is bound to a wall 11 defined in the moveable annular element 3. When the regulator 1 exerts the force on the annular plate 6, the annular plate 6 compresses the spring 8 to generate an elastic force for pushing the moveable annular element 3 to form the axial force on the outer ring of the rolling bearing 4 in response to the motion of the annular plate 6. Hence, by adjusting the regulator 1, the user can adjust the force on the rolling bearing in an axial direction.

Figure 2:
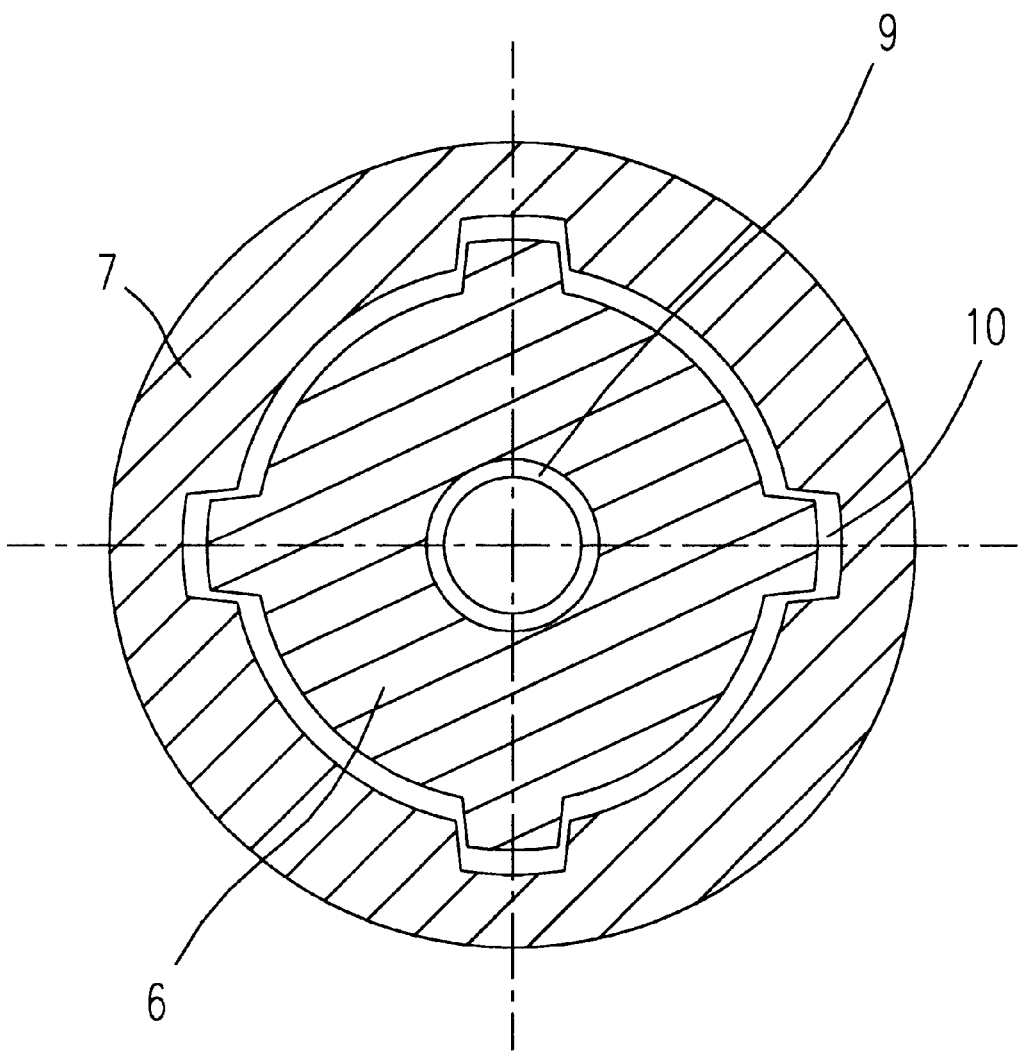
FIG. 2 is a cross-sectional view of the preloading regulating mechanism, taken along with line A—A, of FIG. 1.

In addition, there is an outer fixing member 7 and an inner fixing member 9 for securing the annular plate 6 and the moveable annular element 3. Referring to FIG. 1 again, the moveable annular element 3 is disposed between the outer fixing member 7 and the outer ring of the rolling bearing 4. The annular plate 6 is disposed between the outer fixing member 7 and the inner fixing member 9. Please refer to FIG. 2 showing a cross-sectional view of the preloading regulating mechanism according to present invention. As shown in FIG. 2, there are grooves formed on an inner edge of the outer fixing member 7 for restricting the annular plate 6 to move in straight in response to the force exerted from the regulator 1.

Certainly, the preloading regulating mechanism may have two symmetric regulators or a plurality of symmetric regulators and a plurality of corresponding springs. In addition, the annular plate 5 is not limited to the shape shown in FIG. 2.

According to the description with reference to the accompanying drawings, the preloading regulating mechanism for rolling bearings can rectify the defects encountered with prior arts. Moreover, the preloading regulator mechanism of the present invention can be simply and easily operated and may reduce the manufacturing cost.

The above embodiments can be modified by any skillful person in the art without departing the spirit and scope of the accompanying claims.

What is claim is:

1. A preloading regulating mechanism for a rolling bearing adapted to be used to adjust an axial force on said rolling bearing, comprising:

a first fixing member;

a regulator disposed in said first fixing member for allowing a user to apply a torque thereon, said regulator having a screw bolt disposed in said first fixing member and a handle connected to one end of said screw bolt for rotating said screw bolt;

an annular plate having a first face connected to said regulator for being moved in response to said torque exerted from said regulator;

a resilient member having a first end connected to a second face of said annular plate for urging against said annular plate to form an elastic force; and a movable annular element connected to a second end of said resilient member for transmitting said elastic force to form said axial force on said rolling bearing in response to the motion of said annular plate.

2. The preloading regulating mechanism according to claim 1, wherein said:

screw bolt has screw threads and is mounted in said first fixing member and engaged with corresponding screw threads defined in said first fixing member.

3. The preloading regulating mechanism according to claim 2 wherein said handle is integrally formed to said end of said screw bolt.

4. The preloading regulating mechanism according to claim 2 wherein the other end of said screw bolt is connected to said first face of said annular late.

5. The preloading regulating mechanism according to claim 4 wherein said screw bolt is moved toward said annular plate when said handle is rotated in one direction in a first instance and is moved away from said annular plate when said handle is rotated in the other direction in a second instance.

6. The preloading regulating mechanism according to claim 5 wherein said force exerted on said annular plate increases in said first instance and decrease in said second instance.

7. The preloading regulating mechanism according to claim 1 wherein said first end of said resilient member is bound to said second face of said annular plate and said second end of said resilient member is bound to a wall defined in said moveable annular element for generating said elastic force to form said axial force on said rolling bearing.

8. The preloading regulating mechanism according to claim 7 wherein said resilient member is a spring.

9. The preloading regulating mechanism according to claim 8 wherein said annular plate compresses said spring to form said elastic force when said regulator exerts a force on said annular plate.

10. The preloading regulating mechanism according to claim 1 wherein said preloading regulating mechanism further includes an outer fixing member and an inner fixing member for securing said annular plate and said moveable annular element.

11. The preloading regulating mechanism according to claim 10 wherein said moveable annular element is disposed between said outer fixing member and said rolling bearing.

12. The preloading regulating mechanism according to claim 10 wherein said annular plate is disposed between said outer fixing member and said inner fixing member.

13. The preloading regulating mechanism according to claim 12 wherein there is a groove formed on an inner edge of said outer fixing member for restricting said annular plate to move in a desired direction.

14. The preloading regulating mechanism according to claim 1 wherein said preloading regulating mechanism further includes a plurality of regulators and a plurality of corresponding resilient member.

* * * * *